United States Patent [19]

Zanier

[11] Patent Number: 4,658,510
[45] Date of Patent: Apr. 21, 1987

[54] SENSOR FOR DEVICES FOR MEASURING COMPARATIVE LINEAR MAGNITUDES

[75] Inventor: Adriano Zanier, Prilly, Switzerland

[73] Assignee: Tesa S.A., Renens, Switzerland

[21] Appl. No.: 761,413

[22] Filed: Aug. 1, 1985

[30] Foreign Application Priority Data

Sep. 20, 1984 [CH] Switzerland .................. 4505/84

[51] Int. Cl.$^4$ .............................................. G01B 5/00
[52] U.S. Cl. ...................... 33/172 E; 33/143 L; 33/147 N
[58] Field of Search ............ 33/143 K, 143 J, 143 M, 33/143 R, 143 L, 147 R, 147 N, 147 L, 147 E, 172 E, DIG. 2

[56] References Cited

U.S. PATENT DOCUMENTS 3,107,432 10/1963 Dickison ........................ 33/143 L
3,581,402  6/1971 London ......................... 33/147 L
3,781,997  1/1974 Pagella ......................... 33/143 L

FOREIGN PATENT DOCUMENTS 919413 5/1959 United Kingdom ............ 33/147 N

Primary Examiner—Harry N. Haroian
Attorney, Agent, or Firm—Anthony J. Casella; Gerald E. Hespos

[57] ABSTRACT

The sensor comprises a reference body (1) in which there is displaceably mounted a movable body (3) bearing a measurement finger (6) and a pick-up (9) which translates the displacements of the movable body into electrical signals.

The movable body (3) has a stop (18) subjected to the opposing pressures of two springs (19, 26), one of which (26) lies in the extension of the rod of the piston (24) of a single-acting pneumatic cylinder-piston unit (23).

When the cylinder-piston unit is at rest, the measurement finger is disengaged by pressure of the spring (19) opposite said cylinder-piston unit.

When the cylinder-piston unit is extended, the measurement finger is pressed against the part to be measured by the action of the spring (26) borne by the rod of the piston.

The finger of this sensor is thus disengaged in the position of rest of the cylinder-piston unit and can easily be brought towards the finger of another sensor of the same type in the direction of the taking of the measurement.

1 Claim, 4 Drawing Figures

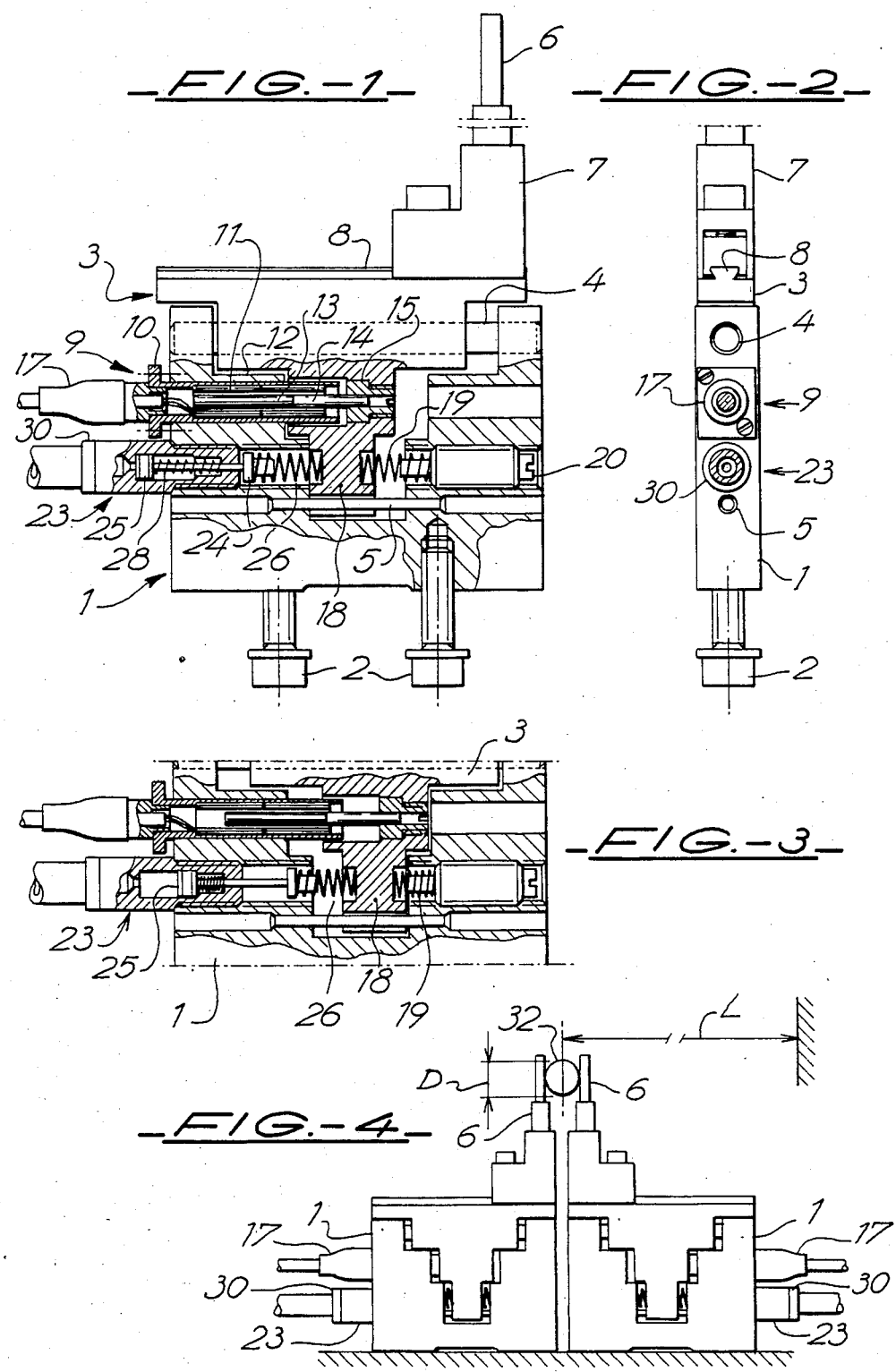

SENSOR FOR DEVICES FOR MEASURING COMPARATIVE LINEAR MAGNITUDES

The object of the present invention is a sensor for devices for measuring comparative linear magnitudes such as, for instance, those used for checking the dimensions of mass-produced parts, in which the measurements effected are representative of differences in magnitude with respect to a zero set to a prescribed nominal valve.

This sensor comprises, as do most ordinary sensors used in such devices, a reference body intended to be fastened on a support suitable for holding a part to be checked, a movable body which is displaceable along guide elements which are rigidly connected to the reference body and bears a measurement finger, a displacement pick-up comprising two detection elements, one connected to the reference body and the other to the movable body in order to supply signals representative of the direction and amplitude of the relative displacements of these two bodies with respect to a preadjusted zero, a measurement pick-up device adapted to deliver a measurement pressure by elastic thrust applied against a stop rigidly attached to the movable body, and a device for the disengagement of the measurement finger adapted to apply against said stop a disengagement counterpressure which is opposite to the measurement pressure.

In this type of sensor the measurement pick-up and finger disengagement devices are adapted to facilitate the dimensional verification operations and make them more reliable. They avoid manual intervention on the movable members of the sensor and, in particular, on the measurement finger, and assure a certain constancy of the pressures applied to the movable body bearing the finger, said last-mentioned function tending to assure the uniformity of the measurement pick-up conditions from one part to another.

In the known sensors of this type, the measurement pressure applied to the movable body bearing the finger is produced by a compression spring which is placed against the stop of said body, and this spring is dimensioned in the best way possible so that the pressure supplied varies little over the measurement stroke of the pick-up, which is generally on the order of a millimeter on both sides of zero. The disengagement counter-pressure of the measurement finger which acts against said spring is produced by a pneumatic cylinder-piston unit whose rod is placed against an element of the movable body such as, for instance, the stop in question, in opposition to said spring.

Upon the making of a measurement, the operator must, first of all, disengage the measurement finger by acting, for instance by manual pressure, on a vacuum pump which is connected to the cylinder-piston unit and keep it disengaged by maintaining the pressure during the placing of the part to be checked in the support of the measurement device. He then effects the taking of the measurement by relaxing the pressure on the cylinder-piston unit, which has the effect of freeing the opposing action of the spring and of pressing the finger against the wall of the element of the part to be checked.

These sensors used in this manner are satisfactory but they do not completely eliminate the risk of rough encounter of the part to be checked with the measurement finger upon the putting in place thereof in the support of the measurement device, as can take place when the operator fails first of all to disengage the finger or else releases it too soon.

Furthermore, on certain sensors of this type, the branching connector for the feed circuit of the cylinder-piston unit of the disengagement device, which is axial, is necessarily on the same side as the finger, the action of this cylinder-piston unit being opposed to that of the measurement pressure. As a result, in certain mountings of multiside devices requiring the bringing of the two measurement fingers of two sensors of this type towards each other, the connectors of these two sensors are face to face and establish interference with respect to bringing them together.

The object of the invention is to eliminate these drawbacks.

For this purpose, the sensor according to the invention is characterized by the fact that the finger disengagement device consists of a first compression spring interposed between a bearing face of the reference body and the stop of the movable body; by the fact that the measurement-taking device consists of a single-acting cylinder-piston unit the cylinder of which is fastened to the reference body and the outer end of the rod of the piston of which comprises a second compression spring interposed between it and the stop of the movable body, said stop being interposed between the first and the second springs and being subject to their opposing pressures; and by the fact that the elastic constancy and the active length of each of these two springs are determined so as to produce the measurement pressure at the end of the extension stroke of the cylinder-piston unit and the disengagement of the measurement finger at the end of the retraction stroke of the cylinder-piston unit.

In this way it is no longer the disengagement of the measurement finger which is controlled by the actuating of the cylinder-piston unit by the operator, as in the case of the said known sensors, but rather the taking of the measurement. This eliminates the risk of the part to be measured coming into rough contact with the measurement finger upon the positioning thereof in the support of the measurement device. In fact, the operator no longer needs to act previously on the cylinder-piston unit in order to disengage the finger, the latter being automatically held disengaged by the action of the first spring when the cylinder-piston unit is in its retracted position of rest.

Furthermore, as the cylinder-piston unit acts in the direction of the taking of the measurement its axial feed connection is naturally opposite the finger, which eliminates the drawback of having it on the same side, as in certain of the said known sensors when the two measurement fingers of two sensors of this type are to be brought together on a multi-side device.

The accompanying drawing shows, by way of example, one embodiment of the object of the invention.

FIG. 1 is a view in elevation and partial section shown in the disengagement configuration of the finger.

FIG. 2 is a side view thereof.

FIG. 3 is a partial elevation in cross-section shown in measurement-taking configuration.

FIG. 4 is an elevation illustrating one particular use of this object.

The sensor shown in FIGS. 1 to 3 comprises:

a reference body 1 having the shape of a notched rectangular parallelepiped intended to be fastened at its base by two screws 2 to the support, not shown, of a measurement device of conventional type used for checking the dimensions of mass-produced parts;

a movable body 3 semi-embedded in the reference body 1 and mounted for displacement by translation with respect to the latter in its plane along a shaft 4 at its upper part and along a slideway 5 at its lower part, said slideway and said shaft being fastened to the reference body 1. The movable body 3 bears a measurement finger 6 screwed into a support 7 fastened on a dovetail bench 8 constituting the upper part of the movable body;

a displacement pick-up 9, in this case an electronic one of the known induction type the cylindrical housing 10 of which, bearing the two coils 11, is fastened in a borehole 12 in the reference body 1 parallel to the shaft 4, the ferrite core 13 of which forms an extension of a measurement rod 14 fastened to the movable body 3 by means of a mandrel 15 engaged and locked by screwing into a cylindrical housing in said movable body aligned with the axis of the borehole 12. The coils 11 and the ferrite core 13 constitute the two detection elements for the relative displacements of reference body 1 and movable body 3; they translate these displacements, in direction and magnitude, with respect to a preadjusted zero, over a reduced measurement path less than the path of which the movable body is capable in the notch of the reference body, into analog electric signals which are transmitted, by a cable 17 connected to the coils 11, to an electronic processing circuit which leads to an analog or digital indicator instrument, all of this in conventional manner, not shown in the drawing.

This sensor also comprises a measurement-taking device and a measurement finger disengagement device, both of which act by opposing pressures applied onto a stop 18 which constitutes in fact here the lower part of the movable body 3 guided by the slideway 5.

The device for the disengagement of the measurement finger consists of a first compression spring 19 interposed between the reference body 1 and the stop 18. On the side of the reference body, this spring 19 is brought against a screw 20 engaged in a threaded hole of said spring. On the side of the stop 18, this spring 19 is placed against the bottom of a first chamfering. The action of this first spring is intended to disengage the measurement finger by displacement of the movable body 3 from the right towards the left in the drawing, as shown in FIG. 1.

The measurement-taking device consists of a single-acting pneumatic cylinder and piston unit 23 the cylinder of which is fastened to the reference body 1 and the outer end 24 of the rod of the piston 25 of which has a second compression spring 26 interposed between it and the stop 18 of the movable body. On the side of the reference body 1, the cylinder of the unit 23 is screwed into a threaded hole in said body and the automatic return of this unit is assured in part by an internal return spring 28. On the side of the stop 18 of the movable body, the second spring 26 is placed against the bottom of a second chamfering opposite the first. The fluid chamber of the cylinder and piston unit 23 has a connection 30 with a conduit connected to a source of compressed air.

The combined actions of the cylinder-piston unit 23 and of the second spring 26 are intended to supply the desired measurement pressure by displacement of this second spring from the left towards the right in the drawing, this measurement pressure being obtained solely by the difference in the opposing pressures applied by the two springs 19 and 26 onto the stop 18 from the time that the piston 25 of said cylinder-piston unit arrives at the end of the extension stroke, as shown in FIG. 3.

Of course, in order to obtain such effect, the elastic constancy as well as the active length of each of these two springs are determined so as to produce at least the permitted minimal value of the measurement pressure desired at the end of the extension stroke of the cylinder-piston unit and the disengagement of the measurement finger at the end of the retraction stroke of this cylinder-piston unit, as has already been stated.

One of the two advantages already indicated is illustrated in FIG. 4. The fact that the pneumatic cylinder-piston unit 23 and its connection 30 are mounted on the side of the reference body 1 opposite the direction of the taking of the measurement and here also on the same side as the connecting cable 17 of the displacement pick-up makes it possible to bring two pick-ups of this type sufficiently close together in the same plane in order, by means of their two measurement fingers 6 which have thus been brought together, to check both the diameter D of a shaft 32 and the distance L of its axis of revolution from a reference plane P perpendicular to the direction of the taking of the measurement, these verifications being obtained on basis of the two comparative measurements supplied by these two sensors.

The invention is, of course, applicable to all sensors of similar principle and in which there arises at least one of the two problems which it makes it possible to solve relative either to their measurement-taking device and their measurement finger disengagement device or to the space taken up by their connections.

Variations may be made.

Thus, for instance, the cylinder-piston unit 23 may also be hydraulic or else be simply replaced by a manually controlled pusher.

The return spring 28 of this cylinder-piston unit 23 which in this case facilitates the disengagement action of the measurement finger supplied by the first spring 19 makes it possible further to reduce the pressure developed by the second spring 26. When this subsidiary effect is not desired, this spring 28 can, of course, be eliminated.

I claim:

1. A sensor for devices for measuring comparative linear magnitudes of parts to be checked held on a suitable support, comprising:

(a) a reference body;
   (b) means for fastening said body to said suitable support;
   (c) a bearing face in said reference body;
   (d) a linear guide affixed to said reference body;
   (e) a movable body displaceable along said linear guide
   (f) a stop affixed to said movable body;
   (g) two opposed rest faces on said stop;
   (h) a measurement finger fastened to said movable body;
   (i) displacement pick-up detection means affixed to said reference body and displacement pick-up detection means affixed to said movable body for providing signals representative of the direction and amplitude of the relative displacements of said reference body and movable body with respect to a preadjusted zero;

(j) a first compression spring interposed between said bearing face and one of the two opposed rest faces of said stop;
(k) limited stroke pusher means mounted in said reference body for limited extension and limited retraction motions therein; and
(l) a second compression spring interposed between said limited stroke pusher means and the other of the two opposed rest faces of said stop, whereby said stop is subjected to permanent and opposed resilient bias by said first and second compression springs, and a resilient pressure of the measurement finger against the part to be checked as well as its disengagement thereof occur respectively at the ends of the extension and retraction motions of said limited stroke pusher means and under the control of the elastic constancy and active length of said first and second compression springs.

* * * * *